(No Model.)
J. H. EICKERSHOFF.
FILTERING AND STERILIZING APPARATUS.
No. 507,264. Patented Oct. 24, 1893.
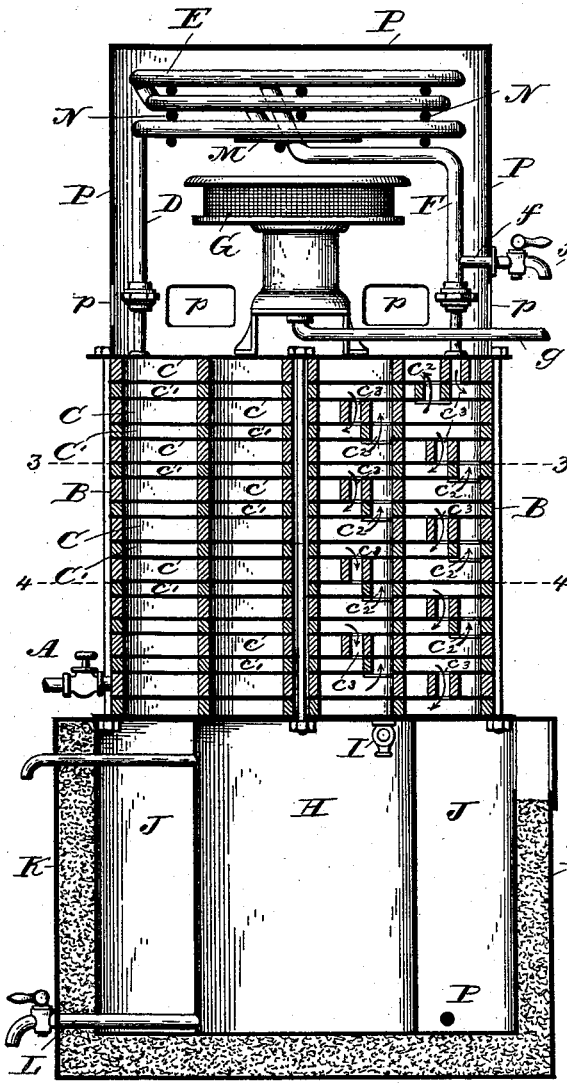
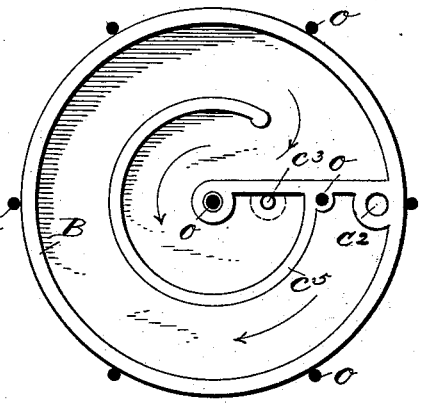
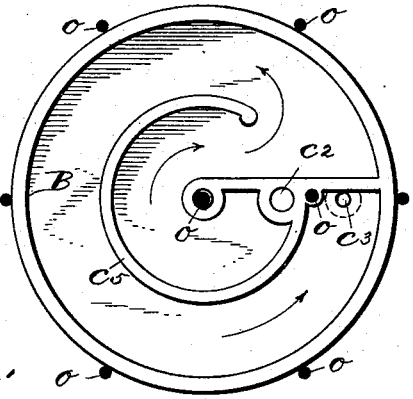
Witnesses:
J. Thomson Cross
Benjamin Bloch
Inventor:
John H. Eickershoff,
By Geo. B. Parkinson,
Attorney.

UNITED STATES PATENT OFFICE.

JOHN H. EICKERSHOFF, OF CINCINNATI, OHIO.

FILTERING AND STERILIZING APPARATUS.

SPECIFICATION forming part of Letters Patent No. 507,264, dated October 24, 1893.

Application filed April 21, 1893. Serial No. 471,305. (No model.)

*To all whom it may concern:*

Be it known that I, JOHN H. EICKERSHOFF, a citizen of the United States of America, residing at Cincinnati, in the county of Hamilton and State of Ohio, have invented certain new and useful Improvements in Filtering and Sterilizing Apparatus, of which the following is a specification.

The object of my invention is to provide simple and efficient apparatus, adapted for use in private families as well as in larger institutions, for filtering and sterilizing water or other liquids, and the invention consists in the parts and combination and arrangement of parts hereinafter described and claimed.

In the drawings: Figure 1. is a vertical section through the apparatus, showing the coil in side view; Fig. 2. a top view of the coil. Fig. 3. is a plan view of one of the plates or partitions between the compartments of the cooling columns on line 3—3 of Fig. 1. Fig. 4. is a plan view of an adjacent plate or partition on line 4—4 of Fig. 1. Fig. 5. is an enlarged detail of one of the filtering passages.

A represents the inlet pipe.

B is the outer sectional wall or casing of a column composed of a series of compartments C, C' separated by a series of plates $c$ and $c'$ preferably of copper. The alternate compartments are connected by pipes or passages $c^2$ and $c^3$, of which the larger openings $c^2$ are for the incoming liquid connecting the compartments C with each other and $c^3$ the smaller openings for the outgoing liquid connecting the compartments C' with each other. The openings $c^2$ are provided at their lower sides with flanges $q$ for the purpose of attaching filters $r$ of cloth or any other suitable material, so that the liquid may be filtered in its inward course. The lower compartment C next to inlet A may be filled with fine gravel or river sand for the same purpose. I propose to make the lower filtering plate of the column of comparatively coarse or porous material and increase the fineness or density of the material with the increase of the temperature of the liquid.

The compartments C and C' are preferably provided with walls $c^5$ extending to the adjacent plate and the walls and the passages for the incoming and outgoing liquid, are so arranged that the liquid must make at least the complete circuit of the compartment before it passes out.

D is a pipe leading from the upper compartment of the column to a coil E and F a pipe leading from the coil to the compartment C' next below the top of the column and preferably provided with a branch $f$ having a cock $f'$.

G is a burner of any approved construction. I have illustrated a gas burner as a preferable construction, and adapted to be supplied by a pipe $g$ which may connect with any convenient gas main.

H is a tank for storage of the sterilized product and I a cock leading from the lower compartment $c'$ to the storage tank. J is an annular chamber surrounding the storage tank and designed to contain some cooling agent. K is a jacket of mineral wool or other non conductor of heat surrounding the chamber, P a pipe for the discharge of liquid from the ice chamber and L the discharge pipe from the storage tank. Above the burner and beneath the coil I prefer to use a deflecting plate M adapted to distribute the flame or products of combustion more evenly upon the surface of the coil.

P' is a casing to inclose the burner and coil, having several openings $p$ near the top of the column for the admission of air to the burner.

N are cross bars adapted to support the coil.

The various compartments of the column are made separately and preferably of brass or other soft metal and are united by clamping with bolts $o$. This enables me to dispense with independent packings, and it becomes a simple matter to take the apparatus apart to remove any deposit of sediment or for other purposes.

The operation is as follows: The water or other liquid to be sterilized is admitted by inlet pipe A from a main or any reservoir which affords sufficient head and passes upward through the alternate compartments C and the filtering openings $c^2$ as indicated by arrows, and into the coil, being filtered by passing through the filtering plate of openings $c^2$ in its upward passage. The burner being lighted, the coil and the liquid therein are heated to any desired degree and the time of passage of the liquid through the coil being regulated by the rate of discharge. When the liquid has been heated to a degree sufficient to destroy all injurious germs it passes downward and through the alternate compartments C' of the column. This liquid goes into the column at at a very high temperature, and in the downward passage serves to heat the cold liquid passing upward through the adjacent compartments of the column thereby utilizing the heat units which would otherwise go to waste. The cock $f'$ permits the withdrawal of the hot sterilized liquid when desired for use in that condition.

I claim—

1. The combination in a sterilizing apparatus, with suitable inlet and discharge pipes, of a column composed of a series of connected compartments separated by a series of intervening and connected compartments, a coil; a burner adapted to heat the coil; a passage from one compartment of one series connecting with the coil and a discharge leading from the coil into one compartment of the other series.

2. The combination in a filtering and sterilizing apparatus of a heating coil; a column having a series of compartments for the incoming liquid and a separate series of compartments for the outgoing liquid; passages connecting the compartments of the respective series and a series of filters of gradually increasing fineness in the path of the incoming liquid.

3. The combination with sterilizing apparatus of a column having its outer wall made in sections; a series of plates dividing the column into compartments, each plate being secured to a separate section of the wall; passages connecting the compartments, and self packing joints for the walls and passages substantially as and for the purpose specified.

JOHN H. EICKERSHOFF.

Witnesses:
CHANNING W. RICHARDS,
BENJAMIN BLOCH.